Patented Oct. 3, 1922.

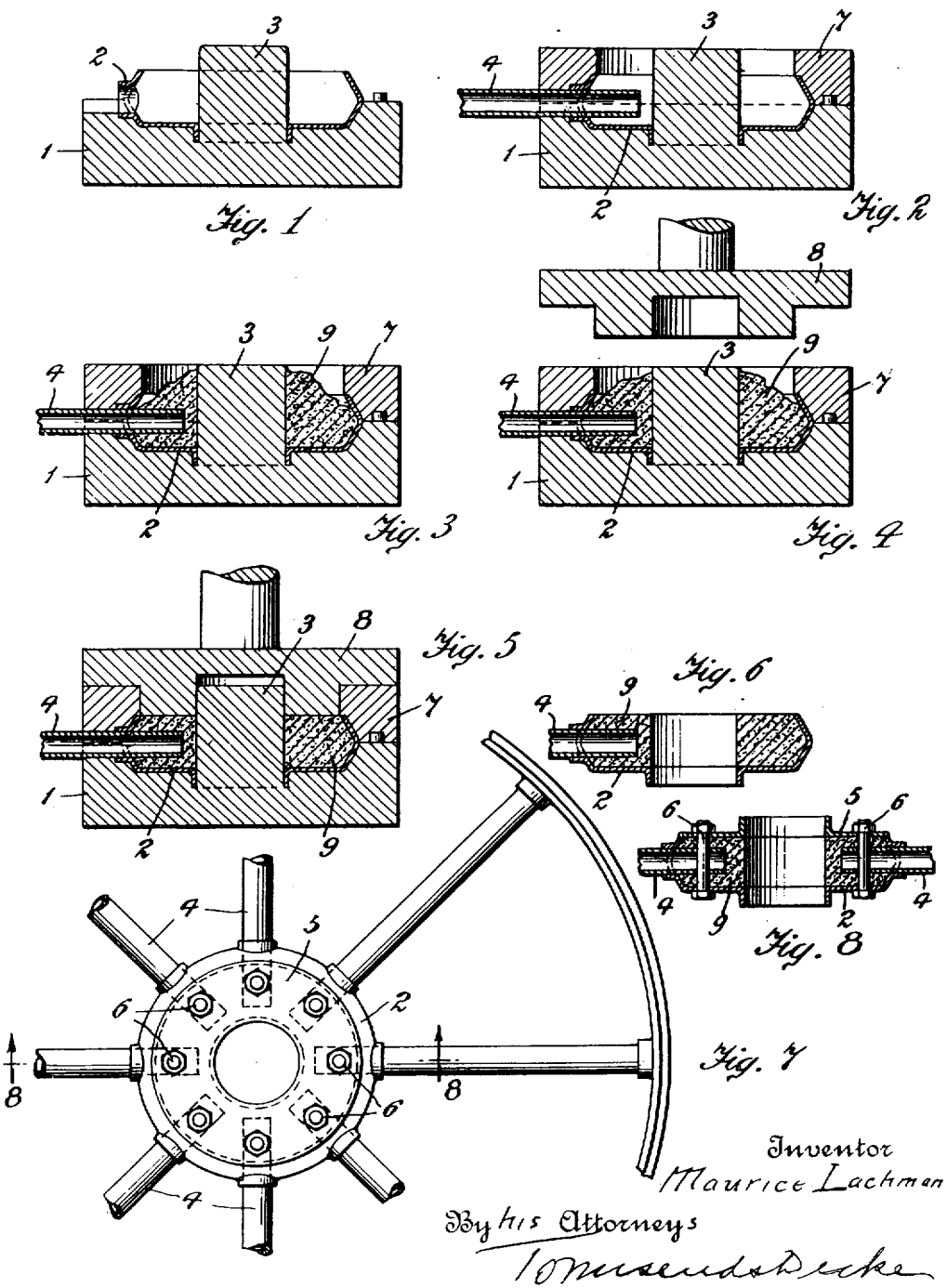

1,430,910

UNITED STATES PATENT OFFICE.

MAURICE LACHMAN, OF NEW YORK, N. Y., ASSIGNOR TO BETHLEHEM STEEL COMPANY, OF BETHLEHEM, PENNSYLVANIA, A CORPORATION OF PENNSYLVANIA.

HUB FILLER FOR METAL WHEELS.

Application filed January 15, 1921. Serial No. 437,403.

*To all whom it may concern:*

Be it known that I, MAURICE LACHMAN, a citizen of the United States, and a resident of New York, in the county of New York and State of New York, have invented certain new and useful Improvements in Hub Fillers for Metal Wheels, of which the following is a specification.

My invention relates to wheels of the class in which the inner ends of the spokes are anchored in the hub shell or hub cavity by a material filling the hub cavity and spaces around said spoke ends.

The invention relates more particularly to wheels of this class when constructed with spokes of metal anchored in a metallic hub shell and consists in the new article or wheel and method of producing the same as more particularly hereinafter described and claimed.

The object of the invention is to produce a wheel having its spokes anchored in a hub filler that shall effectively bind the hub and spokes, keep out all water or moisture and not disintegrate due to the jars and shocks to which the wheel is submitted in use.

My invention consists essentially in a metal wheel having its spokes anchored in the shell by a non-metallic material, plastic when artificially heated so as to be capable of being forced by pressure into the spaces in the shell and around the spoke ends and adapted to become rigid, hard and non-disintegrating and to remain adherent to the metal surface against which it is pressed when the said material is cooled to the normal temperature.

A non-metallic material suitable for the purposes of my invention and fulfilling the requirements thereof is the material known commercially as "gavenite," manufactured and sold by the Gavenite Company of Point Pleasant, in the State of New Jersey, U. S. A., which is frequently employed in the construction of electrical fittings and devices and which, being non-metallic, is not liable to shrink on cooling and does not disintegrate due to use of the wheel. Other materials having the qualities described may obviously be used in place of the gavenite.

In the accompanying drawings:

Fig. 1 is a vertical, central section of the base of a mold adapted for use in carrying out my invention with the particular form of hub shell shown.

Fig. 2 is a similar section through the mold with the top half of the mold applied and the spoke end in place.

Fig. 3 is a section similar to Fig. 2 showing the filling material applied preparatory to the application of the molding pressure.

Fig. 4 is like Fig. 3 with the addition of the pressure tool shown above the same.

Fig. 5 shows the completion of the molding operation and

Fig. 6 the hub shell after removal from the mold and before the attachment of the end plate of the hub.

Fig. 7 is an end view of the hub of the completed wheel and

Fig. 8 is a horizontal section through the hub.

1 indicates the base of the mold formed or adapted to receive and support the hub shell 2 of the particular form shown and provided with the central post 3 by which the central hole of the finished hub is formed in the filler material. The shell 2 is perforated for insertion radially of the metal spokes 4 (although it might be otherwise formed to permit the spoke ends to be located within the hollow hub space) and as shown in Fig. 2. The hub shell indicated embodies one end plate of the hub, the other end plate shown in Fig. 8 at 5 being applied and secured by the bolts 6 after the filler material has been pressed in place.

7 is the top plate of the mold adapted to center or locate the pressing tool 8 shown in Fig. 4 and to confine the movement of the plastic material in the compressing operation so as to cause it to locate itself under the presser within the spaces of the hub shell. The plastic filler material such as gavenite or other material having the characteristics above stated, is indicated at 9. It is supplied in such quantity that when the pressure device 8 is pressed home its exterior flange is stopped against the edge of the top plate 7, the said plastic material will completely fill the cavity and be pressed against the surfaces of the hub shell and spoke ends firmly, being thereafter permitted to cool and the superfluous material, if any, being "dressed" off to secure the finished result indicated in Fig. 6.

Fig. 5 shows the pressure device pressed home and the filler material occupies the spaces within the hub shell, it being assumed that just the right amount of material has been supplied for that result.

In the conduct of the process it will of course be understood that the material might be applied in a softened, homogeneous mass that has been previously worked in a machine or otherwise, or that the material heated may be applied in powdered or granulated form, the powdered mass being heated so as to be in condition to become plastic and fill the shell on the application of pressure.

In carrying out the operation it is preferable that the metallic shell and the spoke should also be heated as this assists in bringing about adherence by the application of pressure and also tends to remove any liability to separation of the surfaces by any difference in their co-efficient of expansion from the heat that might exist. After the completion of the operation as carried out to the point indicated in Fig. 6, holes may be drilled passing through the hub shell, the filler and the hollow spoke ends for the reception of the bolts indicated in Fig. 8, whereby the end plate 5 may be secured in place and the spoke ends further secured against radial movement in the hub.

What I claim as my invention is:—

1. A metal wheel having a metallic spoke anchored in a metallic hub shell by a non-metallic filler consisting of material plastic when artificially heated so as to be capable of being molded by pressure into the space within the hub shell and of the character adapted to become rigid and hard, and to remain adherent to the metallic surfaces against which it is pressed when said material cools to the normal temperature.

2. A metallic wheel having metal spokes anchored within a metallic hub shell by "gavenite".

3. The method of producing a metal wheel having metal spokes anchored by an anchoring material filling the hub cavity and spaces around the spoke ends consisting in assembling the spokes with their ends extending within the shell, applying a material rendered plastic by heat and causing the same to fill the hub spaces and become adherent to the spoke ends and walls of the hub shell by pressure applied to said material while it remains plastic by heat.

4. The method of producing a metal wheel having metal spokes anchored by an anchoring material filling the hub cavity and spaces around the spoke ends consisting in assembling the spokes with their ends extending within the shell, heating the hub shell and spoke ends, applying a material rendered plastic by heat and causing the same to fill the hub spaces and become adherent to the spoke ends and walls of the hub shell by pressure applied to said material while it remains plastic by heat.

Signed at New York in the county of New York and State of New York this 14th day of January A. D. 1921.

MAURICE LACHMAN.